Aug. 17, 1937.   C. J. AMICK   2,090,320
COCKTAIL SHAKER
Filed June 9, 1936

CLAIR J. AMICK, INVENTOR.
BY Slough + Canfield,
ATTORNEYS.

Patented Aug. 17, 1937

2,090,320

UNITED STATES PATENT OFFICE 2,090,320

COCKTAIL SHAKER

Clair J. Amick, Lakewood, Ohio, assignor to The Monarch Aluminum Ware Company, Cleveland, Ohio, a corporation of Ohio Application June 9, 1936, Serial No. 84,331

4 Claims. (Cl. 215—12)

This invention relates to cocktail shakers, and relates more particularly to cocktail shakers of the type employing a metal enclosed glass bottle receptacle.

Cocktail shakers of the type to which my invention appertains have commonly required a great deal of skill in the process of manufacturing, and have been required to be made in such a way as to necessitate expensive mechanical operation whereby the cost of producing such articles has heretofore been costly, especially in the outer casing of the bottle the cost of manufacture has been unduly high, and therefore, so far as I am aware, the latent demand for a low priced cocktail shaker which is very efficient in operation and is quite presentable in appearance, has remained unsatisfied.

An object of my invention, therefore, is to provide an improved cocktail shaker which may be manufactured at low cost.

Another object of my invention is to provide an improved cocktail shaker employing an exterior metallic casing, which may be highly ornamental in appearance, for the purpose of enclosing an interiorly disposed bottle, the latter being preferably of glass construction.

Another object of my invention is to provide an improved cocktail shaker of the above type which will have an outer substantially tubular metallic casing of attractive appearance, but of inexpensive construction, enclosing an interiorly disposed bottle, preferably of glass, with improved means for preventing relative rotation of the bottle and enclosing casing.

Another object of my invention is to provide an improved cocktail shaker of the type described, in which an interiorly disposed glass bottle and enclosing tubular metallic casing may be permanently assembled together in a simple, inexpensive manner.

The aforesaid and other objects of my invention will become more apparent from the following description of an embodiment of my invention, in which reference will be had to the accompanying drawing illustrating a cocktail shaker which is an embodiment of my invention.

Figure 1:
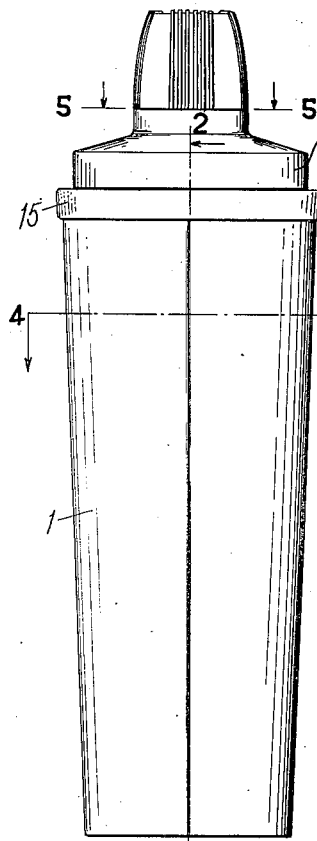
Fig. 1 is an elevational view of a cocktail shaker embodying the principles of my invention.

Referring now to the drawing showing an embodiment of my invention; the cocktail shaker comprises as principal parts, a sheet metal outer casing 1, a bottle or jar 2, and a cover 3.

The bottle 2, is in the form of an elongated glass jar, the side walls of which taper inwardly, proceeding downwardly from the cover supporting mouth portion 6, to the junction of the said side walls with the bottom wall 4. At one side, the side wall of the bottle is provided with a longitudinal groove 5 extending preferably the entire length of the side wall, with the exception of said cover supporting mouth portion, for a purpose later to be described.

The cover supporting mouth 6 is, as shown, preferably cylindrical and of preferably reduced diameter relative to the adjacent portions of the side walls of the jar, and is provided exteriorly with a helical screw-thread 7.

The cover 3 is a piece preferably of molded phenolic condensate material such as bakelite, and comprises a downwardly extending cylindrical attaching flange 8, and an end wall 9 of generally disc form terminating inwardly in a perforated end wall portion 10, said portion 10 being disposed within an upwardly extending cylindrical cap supporting flange 11, an inverted cup shape hollow cap 12 adapted to be fitted onto the flange 11, a tubular downward extension 13 of the cap 12 fitting snugly within the upwardly extending flange 11 of the cover 3, and a shoulder 14 of the cap 12 abutting the end of the cover flange 11.

A casing retaining ring 15 comprising a downwardly extending retaining flange 16 and an upper radially inwardly extending supporting flange 17 secures the metallic casing 1 onto the jar and preferably permanently maintains it in place.

The sheet metal casing 1 is preferably formed of a single piece of sheet metal which may be blanked in the form of a flat sheet with an upstanding flange 18 at one end and a plurality of oppositely extending projections 19 at the other end and the sheet then rolled to the form of a tube, the meeting edge portions 20 and 21 being each reversely turned as shown and said edge portions being rigidly secured together by fitting the terminals of each of said edge portions within a groove formed by the inturning of the terminal of the other edge portion, in the manner shown, and which is well known in the kindred arts for forming cans, stove pipes, and the like, so connecting together the ends 20 and 21.

The joint so formed is off-set inwardly so that no bulge outwardly of the outer surface of the casing 1 will be produced, there being, however, an inward bulge extending inwardly of the general contour of the inner surface of the casing 1, this forming what I will term an inwardly directed seam of the wall of the casing 1. This seam extends longitudinally of the tubular casing 1 and if said casing is made of but a single piece of sheet metal there will be but one such seam for said casing.

Figure 2:
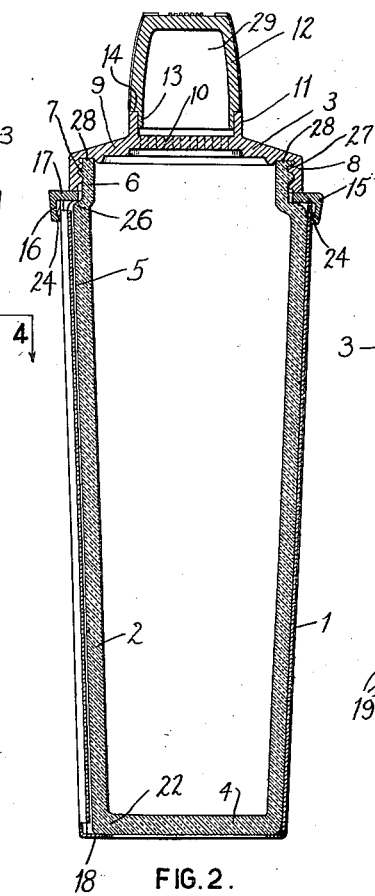
Fig. 2 is a longitudinal sectional view taken on the line 2—2 of Fig. 1.
Figure 3:
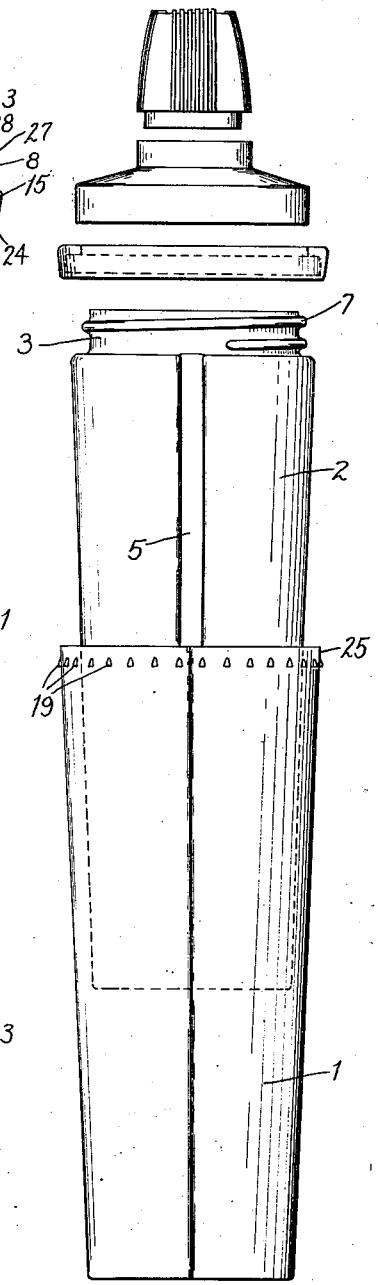
Fig. 3 is an exploded elevational view.
Figure 4:
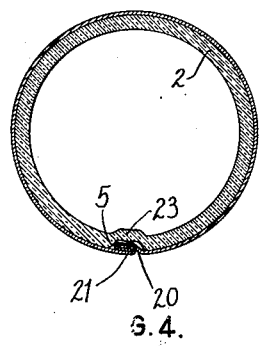
Fig. 4 is a medial sectional view taken on the line 4—4 of Fig. 1.
Figure 5:
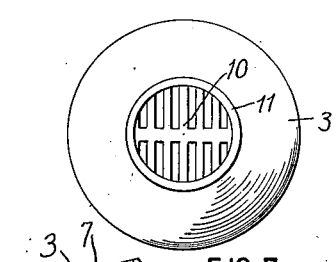
Fig. 5 is a top plan view of one of the parts of Fig. 1 taken approximately on the plane 5—5 of Fig. 1.
Figure 6:
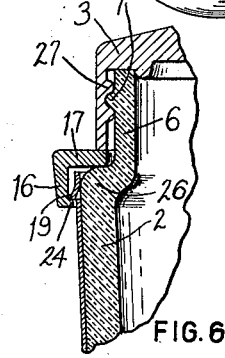
Fig. 6 is an enlarged fragmentary vertical sectional view of an upper laterally disposed portion of said embodiment.

In making the blank for the casing 1, it will be preferably cut so as to have its opposite edges somewhat divergent so that the ultimately formed tubular casing will be somewhat frusto-conical in form and with the portion of smallest diameter containing the inwardly directed flange 18 which forms a partial end wall for the tubular casing 1 and engages a border portion of the end wall 22 of the jar 2 when the jar is telescoped within the casing 1, as illustrated in the drawing, wherein Fig. 3 shows the jar and casing in partially telescoped position, and Fig. 2 shows them in fully assembled telescoped position.

The jar, as has been stated, has a longitudinally extending wall portion shown at 23 pressed inwardly to form at the outer surface of the jar a longitudinally extending depression or groove 5 and in assembling the jar and casing by telescoping the jar 2 within the casing 1, the jar and casing are so rotated that the inward extending seam of the casing registers with and is fitted within the groove 5 of the jar.

Subsequently it is clear that the inwardly projecting seam, being thus indentured with the jar groove, prevents any subsequent relative rotation of the jar and casing.

With the jar and casing thus assembled, the casing retaining ring 15 is next telescoped over the upper end of the casing 1 and said ring 15 comprises at its lower end a very short inwardly extending flange 24 which first fits snugly against the upper outer wall surface 25 of the casing 1, being then pressed downwardly further; said flange extension 24 is snalled over the retaining projections 19, said ring 15 being relatively non-resilient and said wall portion 25 being relatively resilient the portions of said wall will move slightly inwardly and then spring outwardly with the lower edges of said projections 19 fitting over said flange projection 24 of the ring 15.

This being a manufacturer's operation, it is intended that said ring 15 will remain in place with its inwardly extending radial flange 17 fitted over the shoulder 26 of the jar joining the lower end of the mouth 6 and snugly holding the jar slightly longitudinally compressed between said ring flange 17 and the bottom radially extending retaining flange 18 of the casing.

However, if for any reason it is desired to disassemble the casing from the jar, thereafter, this may be done by radially inwardly compressing the upper wall portion of the casing, and applying some force to move the ring 15 axially upwardly from said casing. However, it is expected that the occasions for subsequent disassembling of these parts will be rare.

The upper radially extending flange 17 forms a shoulder stop for the depending tubular flange 18 of the cover 3 when the said cover is secured in place on the mouth 6 of the bottle, this being accomplished by reason of the thread 7 formed on the outer surface of the mouth 6 fitting within a correspondingly directed helical thread groove 27 formed within the inner surface of the cylindrical flange 8 of said cover 3, whereby the cover 3 may be threaded onto the outer surface of the jar mouth 6, until, as stated, its lower end comes in contact with the flange 17 of the ring 15. The upper end of the jar mouth 6 at such time, or immediately thereafter, fits with the annular fluid sealing surface 28 of the cover 3 to prevent leakage of fluid contents of the jar from escaping past the threads 7.

The cap 12 is preferably also molded of bakelite or the like and is preferably hollow so as to make it lighter and to provide an air expansion space 29 on its interior, and makes a cork-like fit within the tubular flange 11 of the cover 3 to frictionally retain it in place. The perforated portion 10 of the cover 3 is of well understood construction and for well known purposes in the use of a cocktail shaker and for dispensing purposes in connection therewith.

Having thus described my invention in a preferred embodiment, I am aware that numerous and extensive departures may be made from the embodiment herein described, but without departing from the spirit and scope of my invention.

What I claim as new is more particularly set forth in the following appended claims.

I claim:

1. In a cocktail shaker, the combination of an interiorly disposed fluid containing jar terminating upwardly in a neck portion, a one-piece sheet metal casing having a longitudinally extending inwardly directed joint seam telescoped over said jar, said casing conforming to the general shape of the outer walls of said jar, exclusive of said jar neck, and said jar having its outer surface grooved longitudinally thereof, said seam being indentured within said groove to prevent relative rotation of the casing and jar, a retaining ring for retaining said casing and jar in assembled relation, and cover means for said jar comprising a disc element provided with a depending annular flange threadedly engaging the jar neck portion and having a centrally perforated portion, and an element of inverted cup-form detachably engaging the disc element radially outwardly of the perforated portion.

2. In a cocktail shaker, the combination of an interiorly disposed fluid containing jar terminating upwardly in a neck portion, a one-piece sheet metal casing having a longitudinally extending inwardly directed joint seam telescoped over said jar, said casing conforming to the general shape of the outer walls of said jar, exclusive of said jar neck, and said jar having its outer surface grooved longitudinally thereof, said seam being indentured within said groove to prevent relative rotation of the casing and jar, means for retaining said casing and jar in assembled relation, said means comprising laterally extending extruded projections of the material of said casing adjacent the upper end thereof, and a retaining ring comprising an upper inwardly extending radial flange and a tubular flange pendantly supported thereby, said radial flange adapted to engage a shoulder on the jar disposed below its said neck portion and said tubular flange telescoped over the upper end portion of said casing, said tubular flange provided with a radially inwardly extending portion adapted to be pressed over said extruded projections of the casing to lockingly retain said jar ring and casing in assembled relation, and cover means for said jar removably secured to the neck thereof and abutting the upper surface of said ring.

3. In a cocktail shaker, the combination of an interiorly disposed fluid containing jar terminating upwardly in a neck portion, a one-piece sheet metal casing having a longitudinally extending inwardly directed joint seam telescoped over said jar, said casing being of generally frusto-conical form and terminating in a radially inwardly extending flange portion at its smaller end, and deforming projections of said casing extending outwardly of the casing wall adjacent to its upper larger end, said jar having its outer surface grooved longitudinally thereof, said seam being indentured within said groove to prevent relative rotation of the casing and jar, a retaining ring for retaining said casing and jar in assembled relation, said retaining ring having an intermediate tubular portion and an inwardly directed radial flange extending from the upper end of said tubular portion, said jar comprising a shoulder intermediate said neck portion and a portion of said jar disposed immediately below said neck portion and which comprises a jar portion of maximum diameter, said flange adapted to engage said shoulder and the tubular portion of said flange comprising projecting portions thereof adapted to be interlocked with said projections formed on the casing so as to lock said casing in place on said jar, and cover means for said jar, said cover means comprising a perforate portion screw-threaded onto said jar neck and a central portion providing an aperture for liquid dispensing purposes.

4. In a cocktail shaker, the combination of an interiorly disposed fluid containing jar terminating upwardly in a neck portion of slightly reduced diameter providing a generally radially extending shoulder adjacent the upper end of the jar, and said jar having its outer surface grooved longitudinally thereof, a one-piece sheet metal casing having a longitudinally extending inwardly directed joint seam telescoped over said jar, said casing conforming to the general shape of the outer walls of said jar, exclusive of said jar neck, and said seam being indentured within said groove to prevent relative rotation of the casing and jar, means for retaining said casing and jar in assembled relation, said means comprising laterally extending extruded projections of the material of said casing adjacent the upper end thereof, and a retaining ring comprising an upper inwardly extending radial flange engaging the jar shoulder and a tubular flange depending therefrom telescoped over the upper end portion of the casing, said tubular flange being provided with a radially inwardly extending portion adapted to be pressed over said extruded projections of the casing to lockingly retain said jar and casing in assembled relation, and removable cover means for said jar comprising a tubular flange sealingly engaging the jar neck portion.

CLAIR J. AMICK.